United States Patent [19]
Leonard

[11] 3,884,114
[45] May 20, 1975

[54] MAJOR AND MINOR CHORD ORGANIZOR

[76] Inventor: Verna M. Leonard, 8701 Highway 41, Fresno, Calif. 93710

[22] Filed: July 24, 1974

[21] Appl. No.: 491,260

[52] U.S. Cl. .................................................. 84/471
[51] Int. Cl. .......................................... G09b 15/02
[58] Field of Search .............................. 84/470–474, 84/477 R

[56] References Cited
UNITED STATES PATENTS

| | | | |
|---|---|---|---|
| 954,436 | 4/1910 | Hunter | 84/474 |
| 2,542,235 | 2/1951 | Clopton | 84/474 |
| 2,938,421 | 5/1960 | Leonard | 84/473 X |

*Primary Examiner*—Richard B. Wilkinson
*Assistant Examiner*—John F. Gonzales
*Attorney, Agent, or Firm*—Ralph S. Branscomb

[57] ABSTRACT

The invention is an aid for teaching the related major and minor chords and their scale tone structures in each key signature, with emphasis on the more advanced forms of these chords. Structurally, the apparatus comprises a rotatable dial mounted on the front panel of an envelope and having a peripheral display of the scale tone names arranged according to the cycle of fourths, and a plurality of sheets individually insertable in the envelope and each having an arcuate array of indicia denoting the scale tone structures of various major and minor chord types and writing spaces, whereby the student can rotate the dial to juxtapose the scale tones named thereon with the indicia and then inscribe the scale tone names of the particular chords determined from the structured array and the juxtaposed scale tones in the writing spaces.

6 Claims, 2 Drawing Figures

MAJOR AND MINOR CHORD ORGANIZOR

BACKGROUND OF THE INVENTION

In analyzing musical compositions one frequently encounters chords that appear to be very complicated and bear no obvious relationship with the key signature in which the piece is composed or the rest of the composition. Most chords which are used in a particular key signature are chosen from specific major and minor chords which are related to the key signature, but are frequently embellished to the point where they are no longer immediately recognizable.

It is therefore desireable that the music student be thoroughly drilled in the major and minor chords in a particular key signature, preferably beginning in the key of C, and work through as many advanced variations of these chords as possible, and repeat this process in all the key signatures.

SUMMARY OF THE INVENTION

The present invention is a workbook which directs the student to write down the major and minor chords in terms of their scale tone names in all the key signatures and in a number of variant forms.

The unit comprises an envelope having a front panel with an arcuate upper edge with spaced peripheral notches therein, and a rotatable dial with a spaced peripheral array of the musical scale tones arranged in accordance with the cycle of fourths and so positioned that rotation of the dial will expose a set of scale tones through the notches in the front panel.

A series of insert sheets are provided which are individually inserted in the envelope, each having an arcuate display of spaced indicia which is adjacent the upper margin of the dial when the sheet is inserted in the envelope. This display comprises an identification of the structure of a particular type of chord adjacent each of the notches of the front panel, and writing spaces below the chord structure identification, the chord type being different for each notch. Upon selecting a particular rotative adjustment of the dial, the student, by using the scale tone displayed in the notch as the root of the chord and building the remainder of the chord with the help of the identified structure on the sheet, can inscribe all the scale tones of the indicated chords in the writing spaces.

Each of the insert sheets may be drawn toward a different set of variations of the basic major and minor chords, and a pair of rotatable blinds can be rotated to isolate particular chords or chord groups for study.

DETAILED DESCRIPTION OF THE PREFERRED EMBODIMENT

Figure 1:
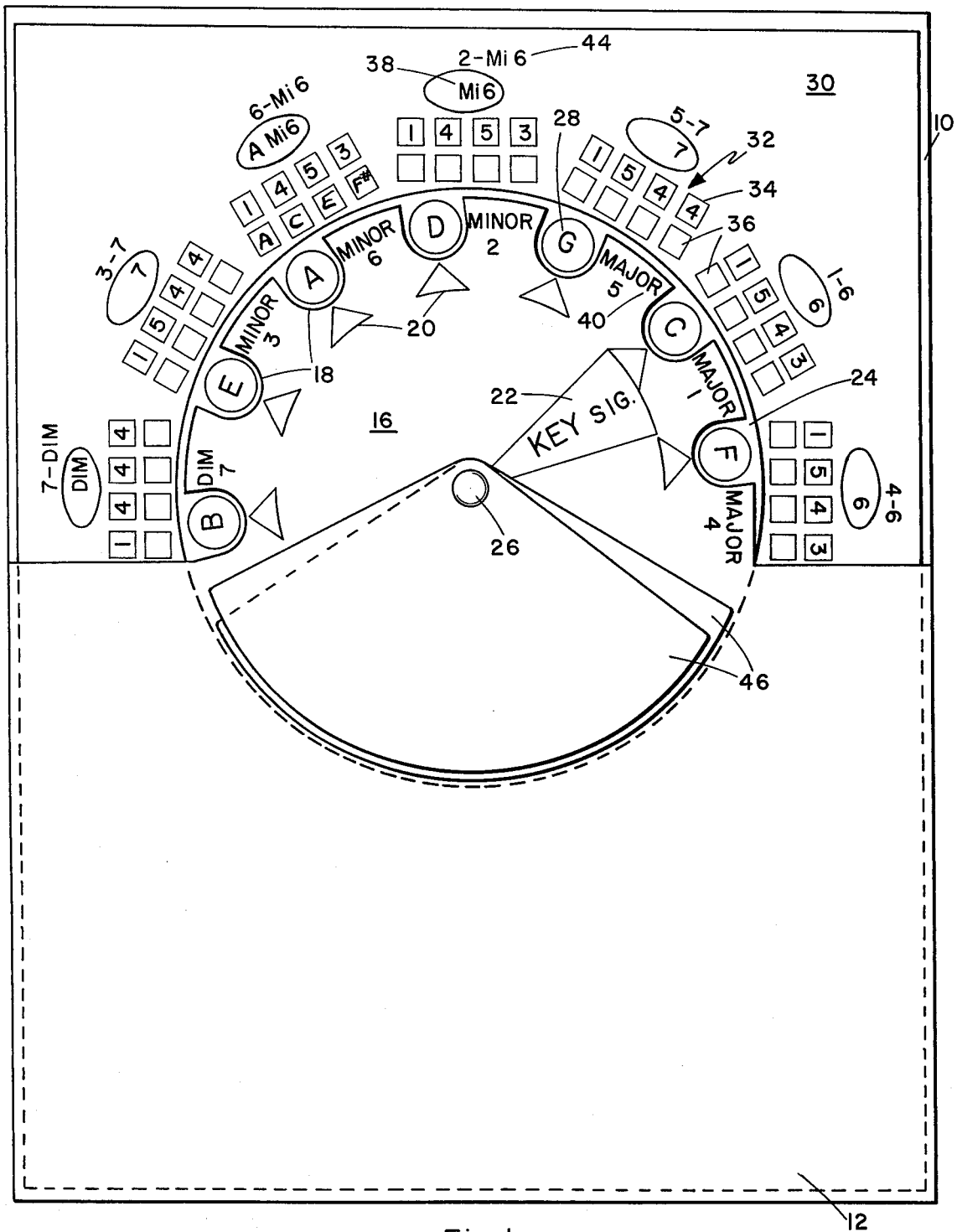
FIG. 1 is a front elevation view of the device.
Figure 2:
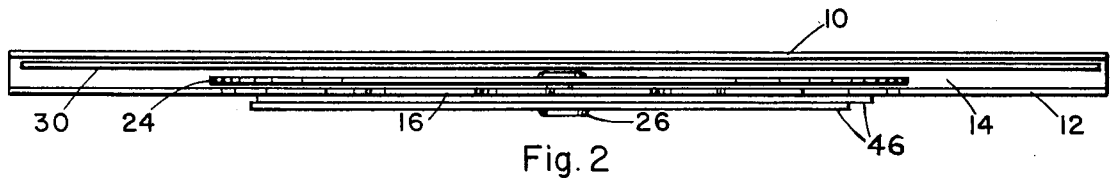
FIG. 2 is a view looking down on the device as illustrated in FIG. 1.

The unit has a rear panel 10 and a forward panel 12 which are jointed at least along their bottom edges to define an envelope 14. The panels may simply be a single sheet of stiff paper folded at the bottom. The upper edge of the forward panel has an arcuate portion 16 which is provided with a plurality of spaced notches 18 which are emphasized by arrows 20, one notch being identified with the key signature as at 22.

Behind the forward panel such as to be substantially coextensive with the arcuate upper edge 16 is a dial 24 rotatably mounted to the forward panel by means of a rivet 26 or the like. The dial is provided with an evenly spaced angular array of the 12 scale tones 28 of a musical scale arranged clockwise in accordance with the cycle of fourths such that upon proper rotation of the dial the named scale tones of upper portions of the dial appear through the notches 18.

A plurality of insert sheets are provided, only one of which is illustrated at 30 in the drawings since the structure of the remaining sheets will become clear from the following description. The sheet 30 is provided with an arcuate array 32 of groups of indicia 34, each of said groups being substantially radially aligned with one of the scale tones named on the dial when the dial is rotated to expose the scale tones through the notches. The structure of a particular type of chord is indicated in each group by a row of numbers 34, which define the intervals between the scale tones in the chromatic scale. The structure could be indicated by the scale degrees of the diatonic scale as well. Each group of indicia also includes a series of writing spaces or squares 36 equal in number to the number of scale tones in the particular chord, and the chord type is also named at 38.

The particular order of the groups of indicia and the chord types to which they relate is important and should be as illustrated. This is because if the scale tones on the dial are arranged in accordance with the cycle of fourths and the particular scale tone identified by the indicia 22 is treated as the key signature, regardless of the setting of the dial the root tones of the major and minor chords will appear as illustrated and indicated by the "Major" and "Minor" indicators on the front panel 12. The diminished chord indicated is of relatively little importance in music and is included only to illustrate chords beginning on all seven of the scale tones used in a particular key signature. An alternative method of identifying chords on the insert sheet is to indicate the scale degree of the root scale tone of the chord in the chosen key signature and follow the numbered scale degrees with the chord type associated therewith, as at 44. In way of further explanation, the upper central indicia 44 reads, "2-M; 6" to indicate that a minor 6th chord beginning on the second scale tone in any key signature is a related minor to they key signature. This notation could be used to the exclusion of the indicia 34 and 38, since an advanced student would know, for example, that 1-4-5-3 is the scale tone spacing of a minor sixth chord. In addition, the indicia 44 could be ordered in accordance with the numbered root scale tones, e.g., "1-6", "2-Mi 6", "3-7" and so forth provided they are spaced according to the whole steps and half steps of the chromatic scale, and the scale tones 28 would be arranged as the consecutive scale tones of the chromatic scale rather than as the cycle of forths.

In use, the student inserts the sheet 30 into the envelope and rotates the dial to select a particular key signature, which is "C" in the illustration. He then inscribes the scale tones of the particular chords constituting the various major, minor, and diminished chords of the key signature in the writing spaces 36. This is done by choosing the root tone of the chord as the tone revealed in the adjacent notch, and the same character is inscribed adjacent the chord type indicia 38, as has been done for the A minor sixth chord. The remaining scale tones can be determined from the chromatic scale tone intervals at 34 and written into the remaining of the writing spaces 36.

When the sheet 30 has been completely filled in, it can be removed and an identical sheet inserted to work through the remaining key signatures by sequentially rotating the dial one notch for each exercise. However, other sheets are provided which are similar to the sheet 30 but represent variations of the major and minor chords illustrated, such as triads, augmented and diminished chords, the possible variations being quite considerable in number and making possible a large set of the sheets which contains no duplicates.

Finally, one, or a pair, of blinds in the shape of circular sectors may be provided and pivoted at their vertices to the rivet 26. The purpose of the blinds is to cover certain of the notches on the dial to concentrate the student on only a portion of the entire chord spectrum, such as the major chords.

After thoroughly drilling in all the key signatures, using several different insert sheets, the student should be thoroughly familiar with the chords related to any key signature and the variations thereof, and capable of determining at a glance the relationship any chord in a musical composition has to the key signature in which it is written.

I claim:

1. An aid for teaching the various major and minor chords related to a particular key signature comprising:
   a. a rear panel and a forward panel joined along at least their lower edges to define an envelope therebetween;
   b. a dial rotatably mounted to said forward panel and having thereon an evenly spaced angular array of scale tone names arranged according to the cycle of fourths;
   c. at least one insert sheet dimensioned to fit within said envelope and having thereon an arcuate array of indicia groups, siad groups being individually alignable radially of said dial with individual ones of said named scale tones upon rotative adjustment of said dial when said sheet is inserted in said envelope;
   d. each of said groups of indicia including a representation of a particular chord type such that by using the radially aligned named scale tones as the root tones of the particular chord types particular chords representing the related major and minor chords of a particular key signature are defined;
   e. each of said groups of indicia further including spaced writing blanks for the user to inscribe the names of the scale tones of the particular chord defined therein.

2. Structure according to claim 1 wherein each of said groups of indicia identifies the scale tone structure of the chord type identified therein and includes spaced writing blanks for the user to inscribe the names of the particular scale tones of the particular chord identified therein.

3. Structure according to claim 1 wherein said disc is mounted to the rear surface of said forward panel and said forward panel has an arcuate upper edge substantially aligned with the upper edge of said disc and is provided with peripheral notches spaced to correspond to the spacing of the named scale tones on said disc such that scale tone names are visible through said notches upon proper rotative adjustment of said dial, said forward panel being further provided with indicia selecting the scale tone exposed through one particular notch as the key signature.

4. Structure according to claim 3 and including at least one blind in the shape of a circular sector pivotally mounted at the vertex thereof to the front of said forward surface coaxially with said dial and being of radial extent substantially equal to the radius of said dial, whereby upon rotation of said blind selected ones of said scale tones on said dial can be covered.

5. Structure according to claim 3 wherein said forwad panel is provided with indicia adjacent each of said notches indicating the named scale tones visible therethrough as a major or minor chord.

6. Structure according to claim 2 wherein said insert sheet is one of a set of insert sheets, the groups of indicia on each sheet of said set including representations of scale tone structures of particular chord types which differ from the particular chord types of every other sheet in said set.

* * * * *